United States Patent
Lewis (10) Patent No.: US 10,530,576 B2
(45) Date of Patent: Jan. 7, 2020

(54) SYSTEM AND METHOD FOR COMPUTING DEVICE WITH IMPROVED FIRMWARE SERVICE SECURITY USING CREDENTIAL-DERIVED ENCRYPTION KEY

(71) Applicant: Insyde Software Corp., Taipei (TW)

(72) Inventor: Timothy A. Lewis, El Dorado Hills, CA (US)

(73) Assignee: Insyde Software Corp., Taipei, Taiwan (CN)

( * ) Notice: Subject to any disclaimer, the term of this patent is extended or adjusted under 35 U.S.C. 154(b) by 4 days.

(21) Appl. No.: 15/041,403

(22) Filed: Feb. 11, 2016

(65) Prior Publication Data

US 2016/0241398 A1  Aug. 18, 2016

Related U.S. Application Data

(60) Provisional application No. 62/115,891, filed on Feb. 13, 2015.

(51) Int. Cl.
*H04L 9/08* (2006.01)
*G06F 21/31* (2013.01)
*G06F 21/62* (2013.01)

(52) U.S. Cl.
CPC ............ *H04L 9/0863* (2013.01); *G06F 21/31* (2013.01); *G06F 21/629* (2013.01)

(58) Field of Classification Search
CPC ....... H04L 9/0863; G06F 21/629; G06F 21/31
See application file for complete search history.

(56) References Cited

U.S. PATENT DOCUMENTS

| | | | |
|---|---|---|---|
| 6,367,010 B1 * | 4/2002 | Venkatram | H04L 9/0822 380/262 |
| 9,660,807 B2 | 5/2017 | Lewis | |
| 9,736,147 B1 * | 8/2017 | Mead | H04L 63/083 |
| 2004/0255106 A1 * | 12/2004 | Rothman | G06F 11/1417 713/1 |
| 2005/0044423 A1 * | 2/2005 | Mellmer | G06F 21/31 726/4 |
| 2010/0306773 A1 * | 12/2010 | Lee | G06F 9/5077 718/1 |
| 2011/0295988 A1 * | 12/2011 | Le Jouan | G06F 21/31 709/223 |

(Continued)

FOREIGN PATENT DOCUMENTS

| | | |
|---|---|---|
| EP | 1926278 A1 | 5/2008 |
| TW | 200833059 A | 8/2008 |

(Continued)

*Primary Examiner* — Cheng-Feng Huang
(74) *Attorney, Agent, or Firm* — McCarter & English, LLP (57) ABSTRACT

A firmware-based technique for using one or more symmetric keys generated from one or more user credentials to decrypt user profile information and authenticate the user before allowing access to firmware-provided services is discussed. Exemplary credential types include user passwords, smart card data, fingerprint sensor data and retinal scan data. The credentials may be verified in a resource-constrained pre-operating system (OS) environment, upon control of the computing device being returned to the firmware by the OS, and/or may enable recovery scenarios executed by the firmware, such as in the case where a password is lost.

23 Claims, 8 Drawing Sheets

(56) References Cited

U.S. PATENT DOCUMENTS

| | | | | |
|---|---|---|---|---|
| 2013/0311784 A1* | 11/2013 | Bleahen | ................... | G06F 21/31 |
| | | | | 713/185 |
| 2014/0068594 A1* | 3/2014 | Young | ................... | G06F 21/572 |
| | | | | 717/172 |
| 2014/0156994 A1* | 6/2014 | Sakuma | ................... | G06F 21/31 |
| | | | | 713/171 |
| 2015/0161391 A1* | 6/2015 | Johnsen | ................ | G06F 21/572 |
| | | | | 713/2 |
| 2015/0220737 A1* | 8/2015 | Rothman | .............. | G06F 21/572 |
| | | | | 726/1 |
| 2015/0304315 A1* | 10/2015 | Estehghari | .......... | H04L 63/0853 |
| | | | | 713/156 |

FOREIGN PATENT DOCUMENTS

| | | |
|---|---|---|
| TW | 201017514 A | 5/2010 |
| WO | 2006/069194 A2 | 6/2006 |

\* cited by examiner

SYSTEM AND METHOD FOR COMPUTING DEVICE WITH IMPROVED FIRMWARE SERVICE SECURITY USING CREDENTIAL-DERIVED ENCRYPTION KEY

RELATED APPLICATION

This application claims the benefit of, and priority to, U.S. Provisional Patent Application No. 62/115,891, entitled "Firmware Secret Storage Using Credential Derived Encryption Key" filed Feb. 13, 2015, the contents of which are incorporated herein by reference in their entirety.

BACKGROUND

Computing devices are initialized by firmware included within the device and this firmware provides a range of software services which facilitate the boot of the operating system (OS) as well as providing a smaller subset of these services that continue to be available after the operating system has booted. Firmware is software that has been written onto Read-Only Memory (ROM) modules including, but not limited to, ROM, PROM, EPROM, EEPROM, and Flash ROM (collectively referred to hereafter as "ROM"). Among other services, the firmware is responsible for operation of the computing device until a boot process can be run which loads an operating system for the computing device into memory. Once loaded, the operating system is in charge of normal operation of the computing device although the provision of certain services after loading of the operating system may require a transition of control from the operating system back to the firmware for security and other reasons.

Unified Extensible Firmware Interface (UEFI) is a specification created by a non-profit industry body detailing a programming interface between the Operating System and the included firmware of a computing device such as, but not limited to, a Personal Computer (PC). UEFI specifications describe a set of tools by which a computing device can move in an organized fashion from the power-applied state to fully operational. The UEFI specification tells the desired result but deliberately does not specify the internal tactic of implementation. The UEFI firmware specification replaces earlier OS/firmware interfaces previously used by the industry and commonly known as legacy BIOS.

When implemented in a computing device, the machine codes for UEFI firmware and all permanent data used by the firmware reside in ROM. In many cases the ROM is an Electrically Erasable silicon device known as a flash ROM. Flash ROM has the characteristic that it can be erased by electrical command and individual elements may then be written and the device will retain the data indefinitely. When power is first applied to the computing device, the system executes a process called reset which clears the state to a known condition and begins execution of the firmware. The firmware is read from the flash ROM or other ROM in the computing device.

BRIEF SUMMARY

Embodiments of the present invention provide techniques for using a key derived from a user credential to decrypt user profile information and authenticate the user before allowing access to firmware-provided services. The technique avoids the firmware ever having to store the password needed to access firmware-provided services on the computing device. Embodiments further enable the use of credential-derived symmetric keys in a multi-factor user identification framework processing two or more user credentials before authorizing firmware-provided services.

In one embodiment, a method enhances security for firmware-provided services in a computing device. The computing device is configured with firmware that when executed causes the computing device to receive a user credential with a user credential driver and generate a first symmetric key from the user credential with the user credential driver. The method also decrypts at least a portion of a first data container with the first symmetric key. The decrypted portion of the first data container holds a second symmetric user profile key previously used to encrypt a private portion of a second data container holding a user profile. The first and second data containers are stored in non-volatile storage. The method further decrypts the private portion of the second data container using the second symmetric user profile key. The user is authenticated based on a determination of a successful decryption of the private portion of the second data container and access is provided to a firmware service following the authenticating.

In another embodiment, a method enhances security for firmware-provided services in a computing device. The computing device is configured with firmware that when executed causes the computing device to receive a user credential with a user credential driver and generate a first symmetric key from the user credential with the user credential driver. The firmware also decrypts at least a portion of a first data container with the first symmetric key. The method receives a second user credential with a second user credential driver and generates a second symmetric key from the second user credential with the second user credential driver. The firmware decrypts at least a portion of a second data container with the second symmetric key. The decrypted portion of the second data container holds a third symmetric user profile key previously used to encrypt a private portion of a third data container holding a user profile. The first, second and third data containers are stored in non-volatile storage. The method further decrypts the private portion of the third data container using the symmetric user profile key and authenticates the user based on a determination of a successful decryption of the private portion of the third data container. Following authentication access to a firmware service is provided to the user.

In an embodiment, a computing device provides enhanced security for firmware-provided services and includes a processor, an input device and firmware. When executed, an authentication module in the firmware causes the computing device to receive a user credential with a user credential driver and generate a first symmetric key from the user credential with the user credential driver. The firmware also decrypts at least a portion of a first data container with the first symmetric key. The decrypted portion of the first data container holds a second symmetric user profile key previously used to encrypt a private portion of a second data container holding a user profile. The first and second data containers are stored in non-volatile storage. The firmware further decrypts the private portion of the second data container using the symmetric user profile key. The user is authenticated based on a determination of a successful decryption of the private portion of the second data container and access is provided to a firmware service following the authenticating.

In one embodiment, a computing device provides enhanced security for firmware-provided services and includes a processor, an input device and firmware. When executed, an authentication module in the firmware causes the computing device to receive a user credential with a user credential driver and generate a first symmetric key from the user credential with the user credential driver. The firmware also decrypts at least a portion of a first data container with the first symmetric key. The firmware additionally causes the computing device to receive a second user credential with a second user credential driver and generates a second symmetric key from the second user credential with the second user credential driver. The execution of the firmware decrypts at least a portion of a second data container with the second symmetric key. The decrypted portion of the second data container holds a third symmetric user profile key previously used to encrypt a private portion of a third data container holding a user profile. The first, second and third data containers are stored in non-volatile storage. The execution of the firmware further decrypts the private portion of the third data container using the symmetric user profile key and authenticates the user based on a determination of a successful decryption of the private portion of the third data container. Following authentication, access to a firmware service is provided to the user.

BRIEF DESCRIPTION OF THE DRAWINGS

The accompanying drawings, which are incorporated in and constitute a part of this specification, illustrate one or more embodiments of the invention and, together with the description, help to explain the invention. In the drawings.

DETAILED DESCRIPTION

Firmware often reserves certain capabilities or privileges for specific users, such as a supervisor, an IT administrator or a manufacturing line worker. In a typical case, these users authenticate themselves to the firmware by inputting a password needed to access firmware-provided services. After verifying the password matches a user, the firmware unlocks certain capabilities, such as access to configuration menus or booting from certain devices or the ability to disable security safeguards. In this environment, the password is the secret. However, fundamentally, firmware is not well-suited to keeping secrets. Modern cryptographic systems focus the security in the key, not in the algorithm. If one knows the key and the algorithm, the secrets are exposed. Asymmetric cryptographic systems improve the situation somewhat by separating the key required for encryption from the key required for decryption so that the key required for decryption can be stored in firmware. This approach however requires the firmware to be tamper-resistant.

Unfortunately, firmware is not an optimal vehicle for protecting passwords (or other stored credentials). Whether stored in plaintext or hashed in some way, someone with persistence and physical access to the flash device Where the firmware is stored can discover both the algorithm and the secret password. This discovery can be done in a number of ways including through an analysis of the firmware contents within the system by a program that can dump the memory-mapped flash contents or by extracting the desired information directly from the flash device and analyzing it on another system. There is also at least a third approach that involves analysis of signals between components in the system as the password is being processed but protecting against that sort of analysis is beyond the scope of the present invention.

To attempt to address these security concerns, some existing password security solutions store the password in a hashed form in a protected portion of the flash device. The more advanced security techniques store the password on a secondary controller such as a keyboard controller, Baseboard Management Controller (BMC) or Trusted Platform Module (TPM). However, these extra devices add cost and complexity to the design. Furthermore, while a TPM provides secure storage to firmware solutions, user profiles cannot be updated at runtime because the TPM locks the platform key before handoff to the Operating System (OS).

Embodiments of the present invention provide a technique of verifying a user credential, such as a password, without actually storing a copy of the credential in a firmware flash device. In one embodiment this credential can be used to securely store additional secrets associated with that user in the firmware device. In another embodiment, multiple credentials can be required to access the same user information. Embodiments may be integrated into a system that supports other credential types (smart card data, fingerprint sensor data, retinal scan data, etc.). The credentials may be verified in a resource-constrained pre-operating system (OS) environment, upon control of the computing device being returned to the firmware by the OS and/or may provide recovery scenarios executed by the firmware, such as in the case where a password is lost. All of these techniques benefit firmware security because the password or other credential is never stored in the firmware. As a result, the credential cannot be extracted, or run against abash database in order to guess the credential and give unauthorized access to user information or user privileges. Additionally, security is further improved as embodiments provide a secure technique for encrypting user data.

In more detail, embodiments of the present invention take advantage of a user's knowledge of a credential that was previously shared with the firmware to encrypt user data. This credential may be, but is not limited to, a password, data acquired from a fingerprint scan or data acquired from a retinal scan. Rather than asking the user for the credential and then comparing the credential to a previously stored version of the credential, embodiments derive a symmetric key from the input credential and attempt to decrypt the user's data (or a hash thereof) with the key. Symmetric keys may be used to both encrypt and decrypt data. Successful decryption indicates that the credential matches the credential previously used to encrypt the data and that the user is authenticated. Failed decryption indicates that the credential does not match and that the user is therefore not authenticated. Since decryption uses a symmetric key derived from the credential rather than performing a comparison with the stored credential, the credential itself is not stored in the firmware. This prevents snooping by an application or the physical direct reading of the flash device by an authorized entity to extract the credential.

Figure 1:
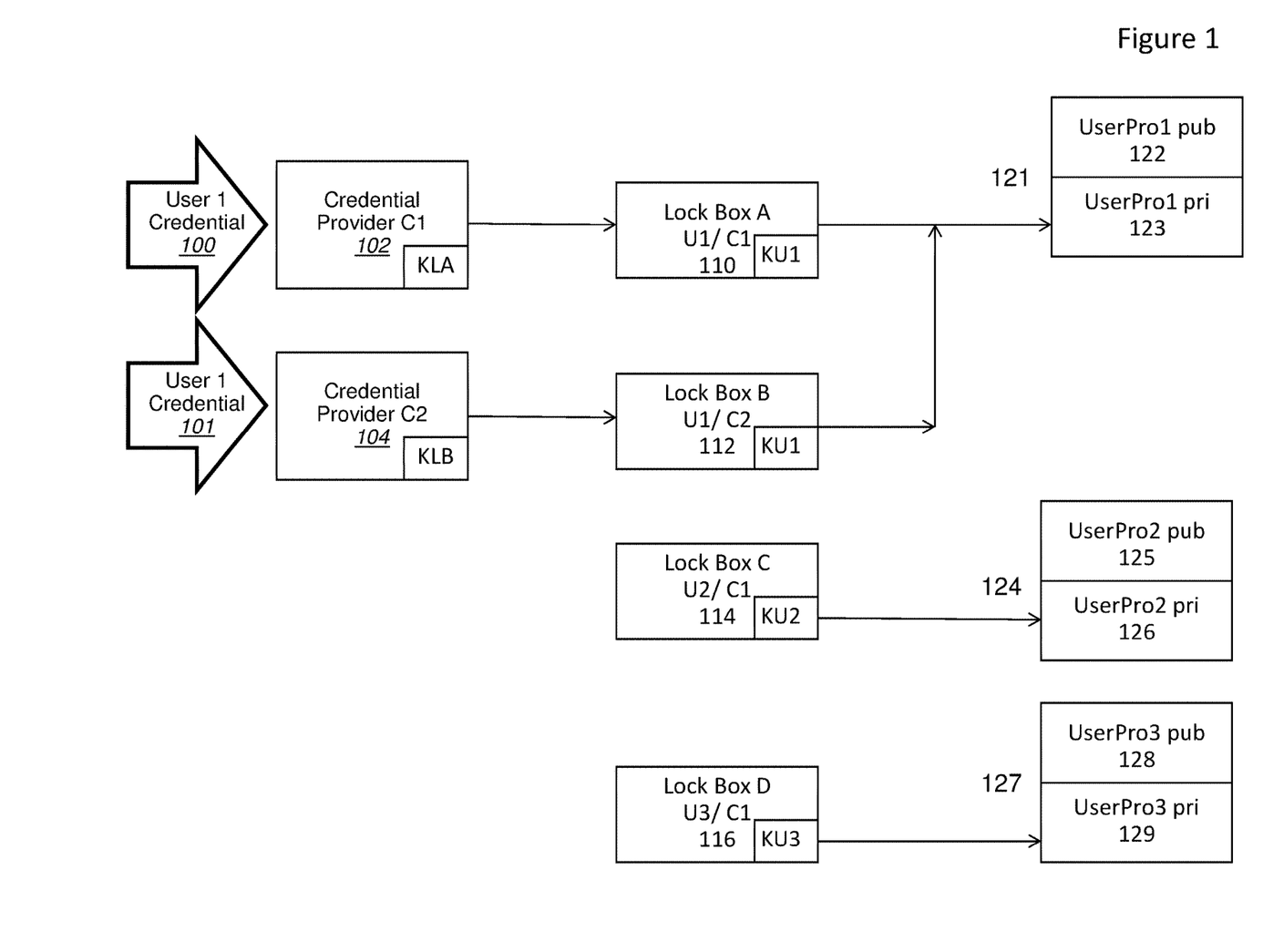
FIG. 1 is a block diagram depicting the interrelationship of credential providers, Lock Boxes and User Profiles in an embodiment of the present invention.

FIG. 1 is a block diagram depicting the interrelationship of credential providers, Lock Boxes and User Profiles in an embodiment of the present invention. Credential providers C1 (102) and C2 (104) are user credential drivers for handling a specific type of user credential. Lock Boxes A-D (110, 112, 114, 116) and user profiles (121, 124, 127) are data containers associated with a specific user that are accessible to executing firmware. These data containers are stored in non-volatile storage, which can include the ROM, a hard drive, etc. The data containers of the present invention include public (non-encrypted) and private (encrypted) portions. Lock Boxes hold symmetric encryption keys and are also associated with a specific type of user credential (e.g.: C1, C2). For example, Credential Provider C1 (102) may accept a first User 1 credential (100) such as a password via keyboard connected to a computing device. Meanwhile, Credential Provider C2 (104) may accept a second type of User 1 credential 101 such as a fingerprint via a fingerprint scanner. As will be explained further below, Credential Providers C1 (102) and C2 (104) respectively generate symmetric keys (KLA, KLB) based on the respective user credential 100, 101 being input. The Credential Provider is stored in tamper-proof non-volatile storage, where updates to the Provider are controlled in a secure manner, such as those provided by UEFI's Capsule Update mechanism.

As noted above, each Lock Box 110, 112, 114, 116 has an encrypted portion and an unencrypted portion. The encrypted portion of the Lock Box holds a symmetric Uses Profile key, KU1/KU2/KU3 in FIG. 1, that was previously used to encrypt a private portion 123, 126, 129 of its associated User Profile 121, 124, 127. The process of initially establishing and encrypting a portion of a User Profile 121, 124, 127 is discussed further below during the discussion of FIG. 7. In turn, the encrypted private portion of each Lock Box has itself previously encrypted by a key produced by a Credential Provider. For example, in FIG. 1, Lock Box A (110) includes a symmetric key KU1 previously used to encrypt the private portion 123 of a User Profile container 121. Because the key is symmetric, it may also be used to decrypt what it had previously encrypted. The key KU1 is held in an encrypted portion of Lock Box A (110) that was encrypted by a symmetric key KLA generated by Credential Provider C1 (102) from an input user password.

Each User Profile container 121, 124, 127 contains an unencrypted portion (UserProXpub) (122, 125, 128) and an encrypted portion (UserProXpri) (123, 126, 129). It should be noted that in FIG. 1, Lock. Box A (110) and Lock Box B (112) refer to the same User Profile 121 indicating that in this case alternative credentials may be used to retrieve the User Profile key needed decrypt the private portion of the User Profile 121. Both Lock Boxes contain a copy of the key that was previously used to encrypt the private portion 123 of User Profile 1 (121). In such a case, the user can unlock Lock Box A (110) to retrieve the key (KU1) needed to unlock User Profile 1 (121) via a key (KLA) generated from a user password (User 1 Credential (100)) provided to Credential Provider C1 (102). Alternatively, the user can unlock Lock Box B (112) to retrieve the same key (KU1) needed to unlock User Profile 1 (121) via a key (KLB) generated from a fingerprint (User 1 Credential (101)) provided to Credential Provider C2 (104). Although not specifically illustrated in FIG. 1, the key needed to unlock the private portion of Lock Box C (114) before accessing the private portion 126 of User Profile 2 (124) would be generated from a password provided by a second user (U2) to Credential Provider C1 (102). Similarly, the key needed to unlock the private portion of Lock Box D (116) before accessing the private portion 129 of User Profile 3 (127) would be generated from a password provided by a third user (U3) to Credential Provider C1 (102).

The Lock Box public (unencrypted) data may contain one user identifier associated with a single User Profile that is constant, even across platform resets. The Lock Box public data also includes one or more User Credential Provider identifiers. Each identifier uniquely identifies a User Credential Provider. The Lock Box private (encrypted) data may contain a salt value and either another Lock Box container (in the case of multi-factor authentication which is discussed further below) or a User Profile symmetric key and an identifier specifying the type of key.

As mentioned above, the User Profile data container may contain two sections: public (unencrypted) and private (encrypted). The public portion includes a unique identifier that can be used to associate a Lock Box with the User Profile. As one example, the unique identifier may be the User Identifier described in the UEFI specification. The public portion of the User Profile may also include items such as the user name, user privilege s and user identification policy. The private portion of the User Profile may include a known salt value that can be used to verify that decryption has been successful. For most cryptographic algorithms, the salt value should be as large as the encryption block size. The private portion of the User Profile may also include other keys such as those used in hard disk encryption which are used prior to boot and thus never exposed to other agents, and/or the user-name/password used for OS log-in, which may be stored in encrypted form using a separate public/private key pair.

For example, in one embodiment the techniques described herein may be used to change the user-login password stored in the private portion of the User Profile. A user may begin by entering their BIOS password required to access firmware services. This password needed to access firmware services is not stored by the system but can be used, as described herein, to generate a symmetric key, to unlock a data container holding another key to a separate data container holding the User Profile with the current OS login password. Once the User Profile has been accessed, a public/private key pair may be generated using known techniques, the new OS password encrypted using the private key and the encrypted password stored in the private portion of the User Profile. The firmware would discard the private key used to encrypt the new OS log-in password and an OS log-in driver would store the public key. During a subsequent boot, the OS driver would attempt to decrypt the private portion of the User Profile containing the OS log-in password in order to authenticate using the public key.

There are several well-known methods to generate a key from a password, such as PKCS#5, also called PBKDF1/2, described in RFC2898 or scrypt or RFC5869. Additionally, as discussed above, other types of user credentials may be processed by User Credential drivers so as to generate symmetric keys. The main requirement is that the User Credential driver be able to produce a cryptographically secure symmetric key based on the user identity. Each Lock Box is associated with a User Profile and one or more user credential types. For example, if a fingerprint can be reliably reproduced time after time, the hash of the fingerprint data may be extended using the same sort of algorithm used for passwords into a symmetric key Similar techniques may be used for data acquired via a retinal scan. Alternatively a fingerprint or PIN number may unlock storage that holds a previously enrolled symmetric key. Furthermore, the symmetric key may be stored on a USB key, encrypted by a private key generated during enrollment, while the public key was maintained in the firmware so that, when the USB key was inserted, the firmware may decrypt the KB from the USB key (similar approaches using certificates are also possible). Additionally, the WWID of a specific USB mass storage device may be extended into a symmetric key so that all keys stored on the USB key would be trusted.

Figure 2:
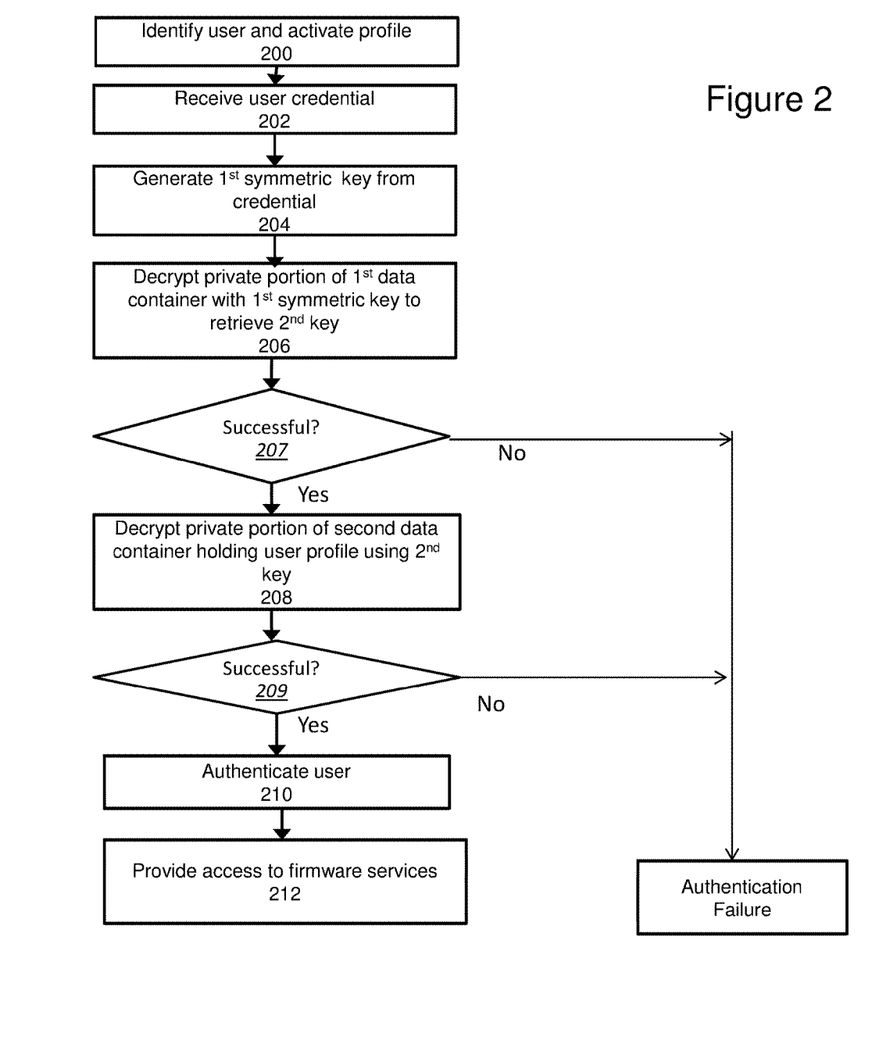
FIG. 2 depicts an exemplary sequence of steps performed by an authentication module in an embodiment of the present invention to authenticate a user before providing access to firmware services.

The use of credential-derived keys by embodiments of the present invention enables user authentication to be conducted in advance of providing firmware services without the firmware relying on stored credentials. FIG. 2 depicts an exemplary sequence of steps performed by an authentication module in an embodiment of the present invention to authenticate a user before providing access to firmware services. The sequence begins with a firmware authentication module identifying the user operating the computing device and activating the user's profile (step 200). Activating the user's profile in the UEFI specification involves selecting a specific User Profile as the current User Profile. The current User Profile details the privilege level at which certain services will operate. For example, which devices are available for boot, etc. A credential, such as a password, is received for the specific user via a Credential Provider (step 202) which then generates a $1^{st}$ symmetric key from the received credential (step 204). The associated Lock Box for the user is identified, via a User Identifier or otherwise, and the generated symmetric key is used to attempt to decrypt the private portion of the Lock Box holding a User Profile key (step 206). It will be appreciated that the private portion of the associated Lock Box was previously encrypted during user enrollment by an identical symmetric key. In one embodiment, the user name and credential are both received by the firmware and a User Identifier needed to identify an associated Lock Box for the user can be found by searching the public portions of the User Profiles. In another embodiment only the credential is received, and all Lock Boxes associated with the type of User Credential provider are searched until one is found that can be decrypted (since the User Identifier is not known). In one embodiment, a successful decryption may be indicated by a correct/known salt value contained in the decrypted private portion of the Lock Box and a failed decryption may be indicated by the incorrect salt value in the decrypted Lock Box private data. If the attempted decryption is not successful (step 207), a system policy may lead to retries by the user or a simple sequence exit indicative of authentication failure. If the attempted decryption is successful (step 207), the User Profile key is retrieved from the private portion of the Lock Box and used to attempt decryption of the private portion of the User Profile data container (step 208). It will be appreciated that the private portion of the associated User Profile was previously encrypted during user enrollment by an identical symmetric User Profile key. If the attempted decryption is not successful (step 209), the authentication process fails. If the attempted decryption of the private portion of the User Profile data container is successful, the user is considered authenticated (step 210) and the authentication module provides access to desired firmware services to which the user is allowed access (step 212). Similarly to the decryption of the Lock Box, in one embodiment, successful decryption is indicated by a correct/known salt value in the decrypted User Profile private data. Failed decryption is indicated by the incorrect salt value in the decrypted User Profile private data. The failure case may be treated the same way as failing to decrypt the Lock Box. In some embodiments, any temporary copies of the keys and received credentials used to respectively decrypt the Lock Box and private portion of the User Profile are discarded by the firmware for security reasons before the sequence ends.

Embodiments of the present invention also support multi-factor authentication whereby two credentials, which may be required to be different types of user credentials, are both required before firmware services are provided to a user. More particularly, the Lock Box private data may contain a symmetric key or another Lock Box private data structure. This configuration may be used to support multi-factor authentication where two or more devices are required to identify a user. For example, a fingerprint and a password may be required to identify a user. In this case, the Lock Box public data may contain the User Profile identifier and two or more User Credential identifiers. The Lock Box private data may be encrypted by a first User Credential Provider-generated key and then that data is encrypted by a second User-Credential Provider-generated key. It should be noted that his approach only supports an AND user identification policy (i.e. fingerprint AND password), but not an OR (fingerprint OR password). A User Identification policy may specify which user credentials should be used for a specific User Profile. The User Identification policy may be located in the public portion of a User Profile. In one embodiment, the policy may include a boolean expression, where the leaf terms are User Credential identifiers (either for specific User Credential providers like a specific vendor's fingerprint sensor or for classes of User Credential Providers, like a fingerprint sensor), joined together by boolean operators such as AND and OR. Using the Multi-Factor extensions, above, a Lock Box can support AND operators directly and multiple Lock Boxes can support OR operations. A NOT operator cannot be supported directly. One example of a simple credential provider reads the current setting of a switch or jumper on the motherboard. If the switch or jumper is "on" then the User Credential provider reports a logical TRUE. Accordingly, if the policy is Password AND (Jumper OR Fingerprint), this may be broken down into two Lock Boxes with Password AND Jumper, and Password AND Fingerprint. Both Lock Boxes are associated with the same User Profile. Alternately, the Lock Box private data structure may be extended to support multiple "OR" alternates at each level of nesting.

Figure 3:
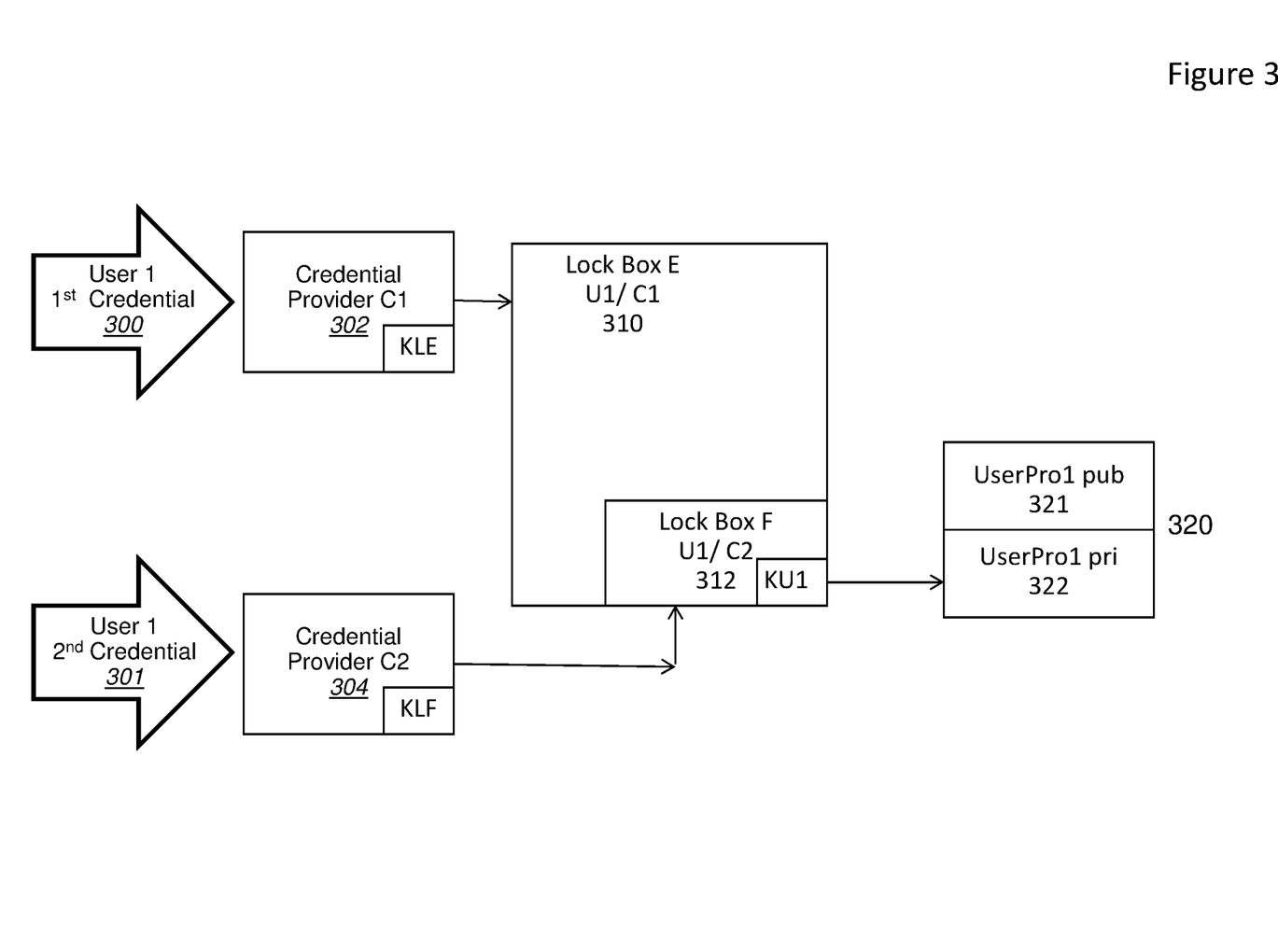
FIG. 3 is a block diagram depicting the use of two credential providers to access Lock Boxes and an associated User Profile in an embodiment of the present invention.

FIG. 3 is a block diagram depicting the use of two credential providers to access Lock Boxes and an associated User Profile in an embodiment of the present invention. As briefly mentioned in the discussion of FIG. 1, instead of the private portion of a Lock Box containing data, the private portion may contain an additional nested Lock Box which also would require decrypting. For example, in FIG. 3, a first user 1 credential 300, such as a password, may be received by the firmware Credential Provider C1 (302) and used to generate a first symmetric key (KLE). The first symmetric key may be used to decrypt a private portion of Lock Box E 310 that is associated with User Profile 320. Decryption of the private portion of Lock Box E however may expose Lock Box F 312. Access to the private portion of Lock Box F requires key KLF generated by Credential Provider C2 (304) from a second/second type of user 1 credential 301.

For example, key KLF may be generated from an input fingerprint. The private portion of Lock Box F 312 may contain key KU1 used to decrypt the private portion 322 of User Profile 320. It will be appreciated that although two nested Lock Boxes are depicted as nested in FIG. 3, additional Lock Boxes totaling more than two may be nested without departing from the scope of the present invention.

Figure 4:
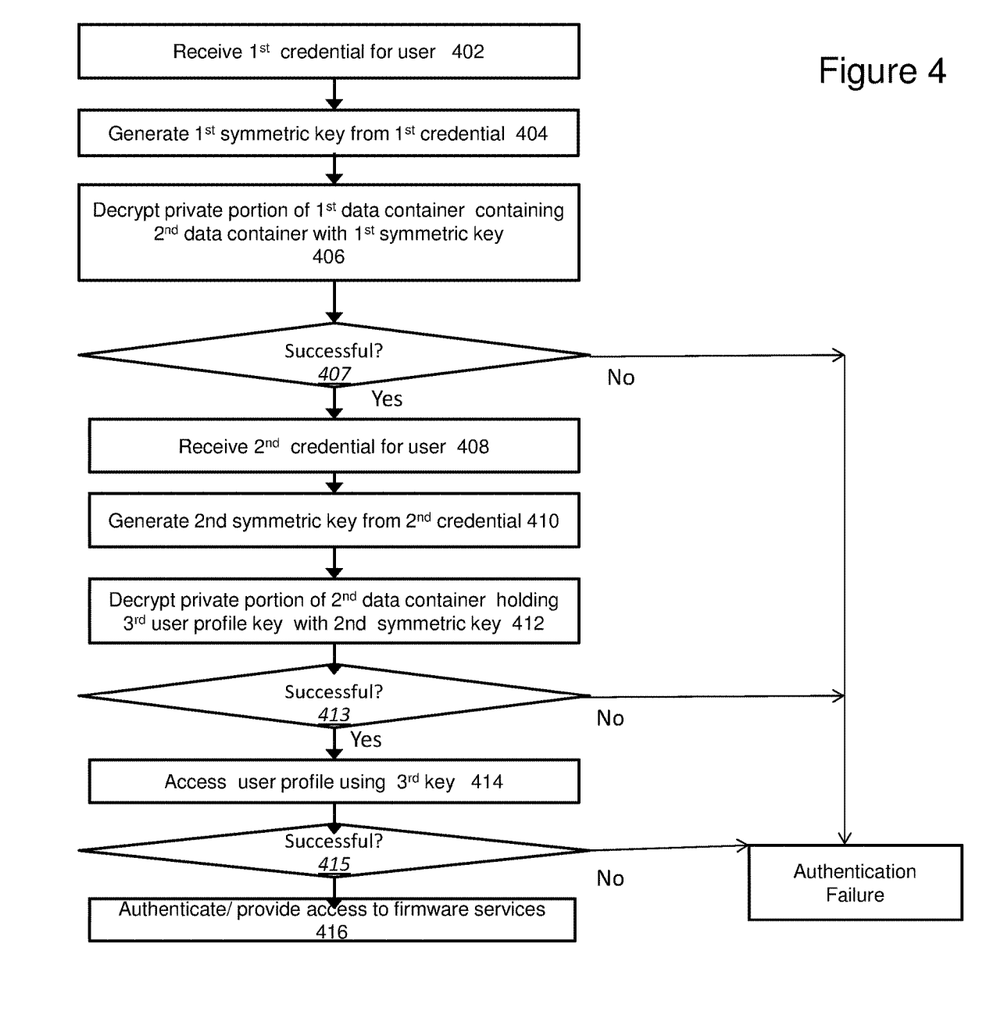
FIG. 4 depicts an exemplary sequence of steps performed by an authentication module in an embodiment of the present invention requiring the use of two credentials to authenticate a user before providing access to firmware services.

An exemplary multi-factor authentication process is depicted in FIG. 4. More particularly, FIG. 4 depicts an exemplary sequence of steps performed by an authentication module in an embodiment of the present invention requiring the use of two credentials to authenticate a user before providing access to firmware services. After an indication of a desire to access firmware services is received by the computing device, the sequence begins with the firmware receiving a first credential for a user via a first credential provider (step 402). The first credential provider generates a $1^{st}$ symmetric key from the first credential (step 404). The generated $1^{st}$ symmetric key is used to attempt decryption of the private portion of a first data container containing a second data container (step 406). If the decryption attempt is successful, the firmware receives a second credential (step 408). It will be appreciated that the second credential, without limitation, may be a second credential from the same user (such as a different password), a second type of credential for the same user (such as a fingerprint or retinal scan), or even a second credential from a different user in a situation where two individuals are required for authorization. The second credential provider generates a $2^{nd}$ symmetric key from the second credential's data (step 410) and the generated $2^{nd}$ symmetric key is used to attempt decryption of the private portion of the $2^{nd}$ data container holding a User Profile key (step 412). If the decryption attempt is successful (step 413), the retrieved User Profile key is used to attempt to decrypt the private portion of an associated User Profile data container (step 414). If the decryption attempt of the private portion of the User Profile is successful (step 415), the user is authenticated by the firmware and provided access to firmware services for which the user is authorized (step 416).

Figure 5:
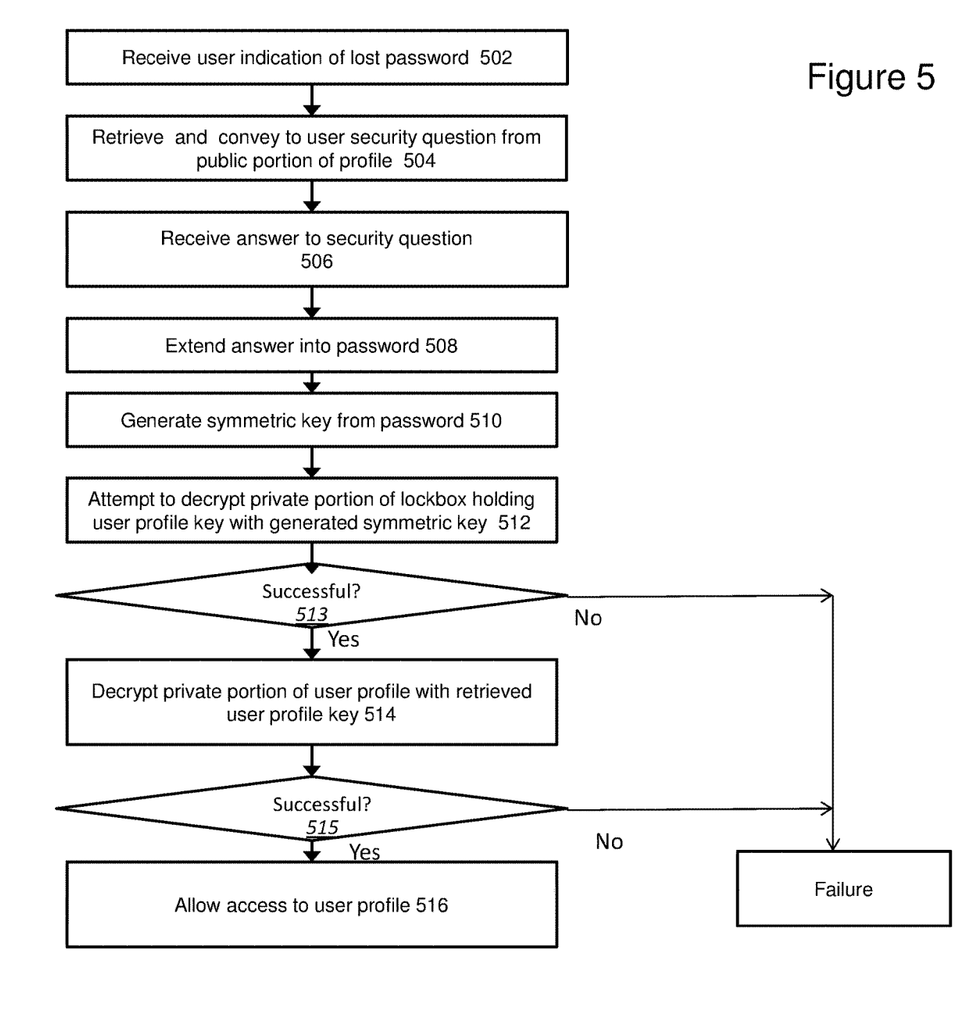
FIG. 5 depicts an exemplary sequence of steps performed by an embodiment of the present invention to access firmware services despite a lost user password.

FIG. 5 depicts an exemplary sequence of steps performed by an embodiment of the present invention to enable access to firmware services despite a lost user password. The sequence begins with the firmware receiving an indication of a lost user password (step 502). For example, when the user forgets their password, they may select a "Forgot password?" link or button which triggers the recovery sequence. One of the common means of recovering a password is to ask one or more security questions. If the user is able to enter the correct answer to the security questions, then the user is able to get into his/her User Profile and reset his/her password. In one embodiment, these security questions are encoded in the public portion of the user's User Profile. The firmware retrieves a security question from the public portion of the User Profile and conveys it to the user (step 504). The number of questions to present is a configurable policy. An answer to the question or questions is then received (step 506). The answer/answers to the question/questions are extended into a password (step 508) and a symmetric key is generated from the password (step 510). The firmware attempts to decrypt the private portion of an associated Lock Box holding a User Profile key that may be used to access the private portion of the User Profile container (step 512). If the decryption is successful (step 513), the retrieved User Profile key is used to attempt decryption of the private portion of the associated User Profile (step 514. If the attempt is successful (step 515), the user is allowed to access his or her authorized firmware services (step 516).

Figure 6:
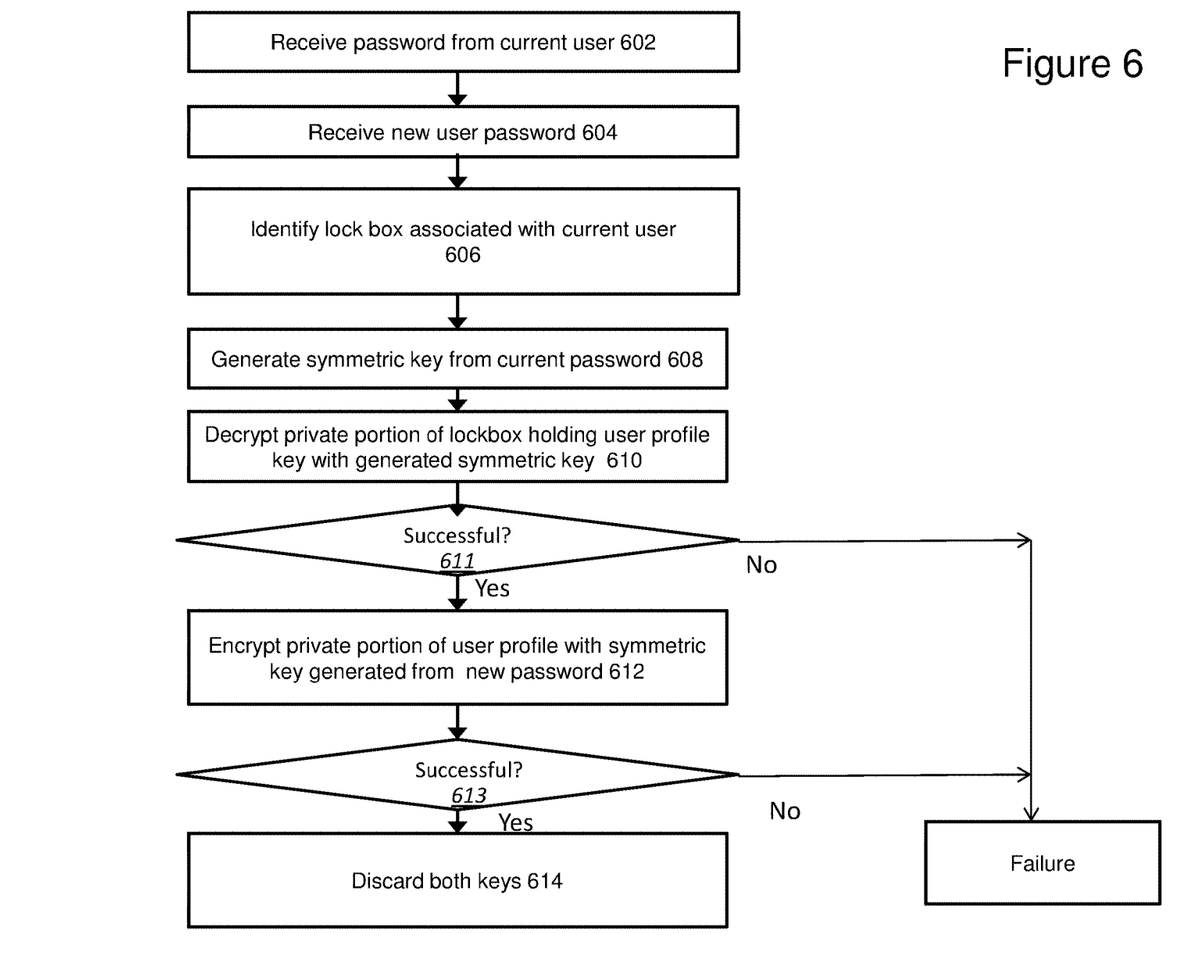
FIG. 6 depicts an exemplary sequence of steps performed by an embodiment of the present invention to respond to changed passwords.

The techniques described above that utilize credential-derived symmetric keys can also be used to change passwords. FIG. 6 depicts an exemplary sequence of steps performed by an embodiment of the present invention to change passwords. The sequence assumes that there is a current active User Profile and that this User Profile has the privilege to change its own password. Some User Profiles (such as 'guest' profiles) do not have such privileges. Entries for the current user and associated password are received (step 602). An entered new password for a user is also received (step 604) and a Lock Box associated with the user and the password Credential Provider is identified (step 606). A symmetric key is generated from the current password (step 608) and used to attempt decryption of the private portion of the Lock Box (holding the User Profile key) (step 610). If the attempt is successful (step 611), the private portion of the Lock Box is then re-encrypted with a symmetric key generated from the new password (step 612). If successful, the password has been changed as only the new password will in the future generate the symmetric key needed to decrypt the re-encrypted Lock Box. Both keys generated from the new and old passwords are then discarded (step 614), as is the input password data, before the sequence ends.

Figure 7:
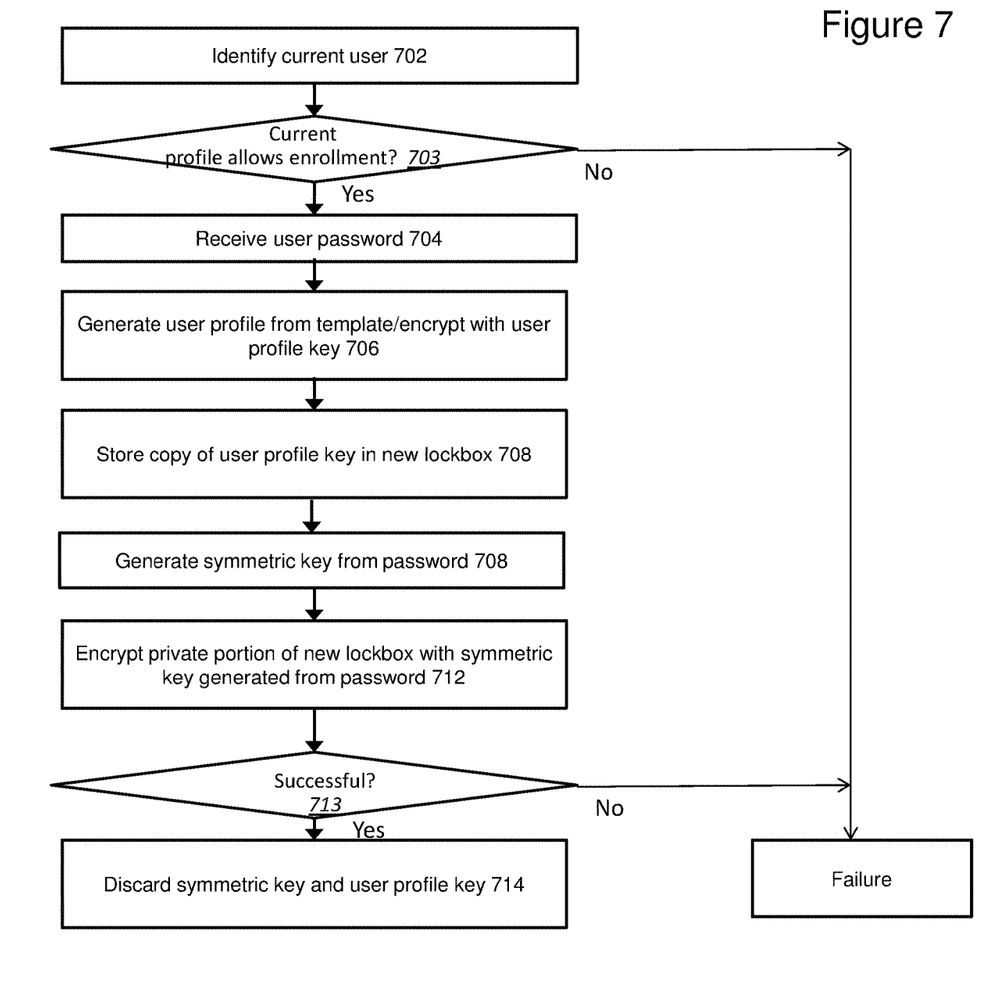
FIG. 7 depicts an exemplary sequence of steps performed by an embodiment of the present invention to enroll a new User Profile.

In order for the techniques that have been described herein to function, the User Profile container and Lock Box containers associated with the user are first established and encrypted using the same symmetric keys that will be later used to decrypt them. FIG. 7 depicts an exemplary sequence of steps performed by an embodiment of the present invention to initially create a new User Profile. The sequence begins by identifying the user (step 702) and checking whether the current User Profile (if there is one active) allows new user enrollment (step 703). New user enrollment is often a privilege assigned to specific users or specific classes of users. If the current User Profile does not allow new user enrollment, then the process exits. Assuming that new user enrollment is allowed (step 703), a password is received for a specific user (step 704). This step includes gathering any other initial information required to fill the User Profile (such as the user name), and may include copying a template User Profile containing the desired default privileges and user identification policy and then receiving the password for the new user. The password's complexity is also enforced at this stage. For example, a requirement that the password contain upper and lower-case and numbers and punctuation or not repeating previous passwords. The basic User Profile (public and private) is then created with the user name and a template that contains basic user privilege information. The template may be related to the current user, may be selected by the current user or may be a general-purpose default. The private portion of the User Profile is then encrypted using a randomly generated symmetric User Profile key (step 706) The means of randomly generating symmetric keys are well-known. The Lock Box is divided into a public (unencrypted) portion and private (encrypted) portion. The public portion contains a User Credential identifier (to associate it with the User Credential driver) and the User Identifier (to associate it with the User Profile created in step 706). The User Profile key that was used to encrypt the private portion of the User Profile is stored in the private portion of the Lock Box (step 708). In one embodiment, the User Profile key is stored along with a salt value used to verify decryption. A User Credential Provider generates a symmetric key from the received password (step 710) and attempts to encrypt the private portion of the new Lock Box (step 712). If the encryption is successful (step 713) then the User Profile is established and the copies of the User Profile key and symmetric key generated from the password are discarded by the firmware. In this manner, subsequent authentication processes do not require a stored password to be matched to an input password thus limiting security risks. It will be appreciated that this same process is also applicable for other types of non-password credentials.

Figure 8:
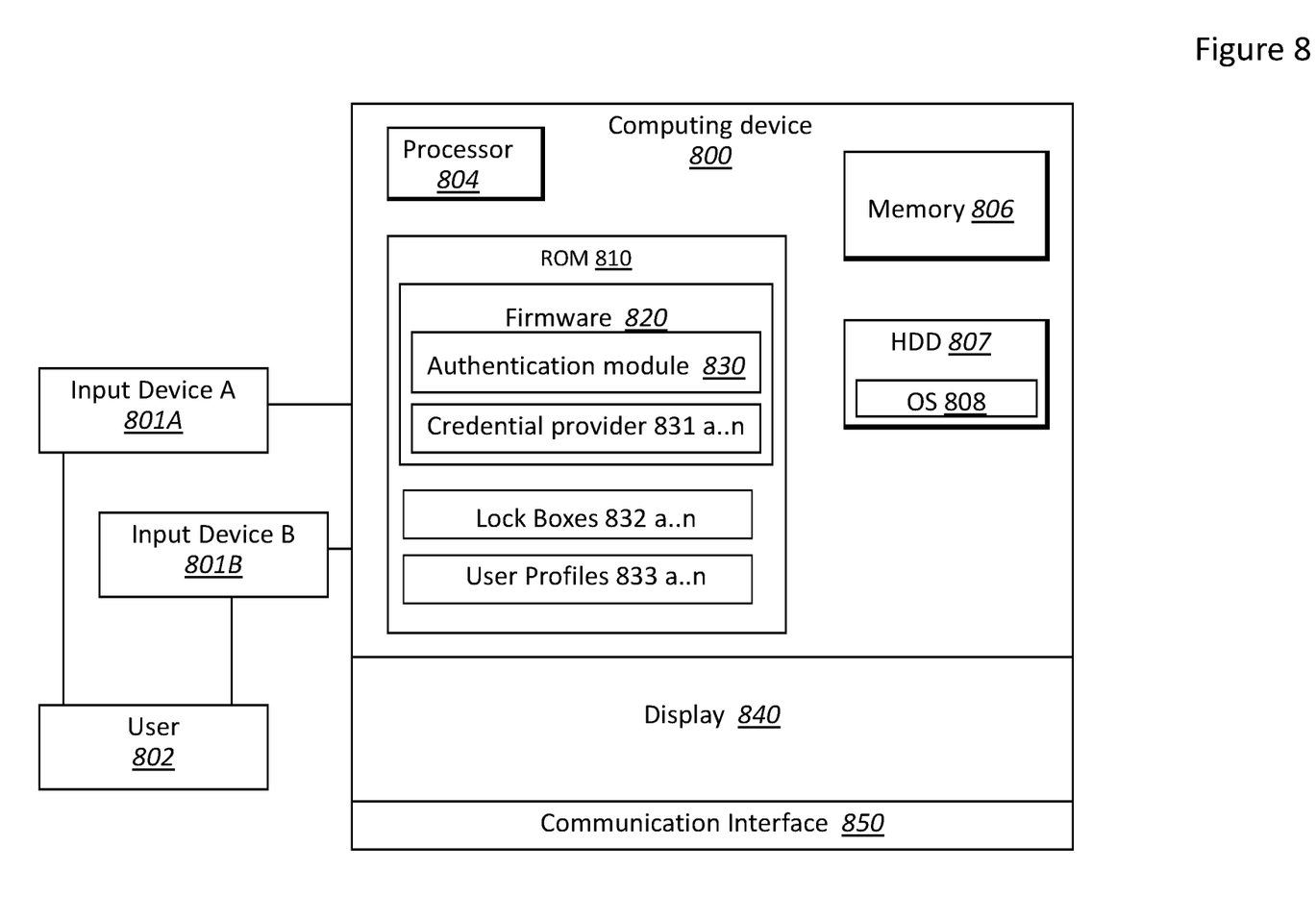
FIG. 8 depicts an exemplary computing device suitable for use by an embodiment of the present invention.

FIG. 8 depicts an exemplary computing device 800 suitable for use by an embodiment of the present invention. Computing device 800 may be a server, desktop computing device, tablet computing device, laptop, smartphone or some type of other electronic device equipped with a processor. Computing device 800 includes one or more processors, such as CPUs, 804 and memory 806. Memory 806 may be Random Access Memory (RAM). Computing device 800 may include a hard disk drive (HDD) 807 holding an operating system 808 which is loaded into memory 806 by firmware 810 during a boot process for the computing device. Computing device 800 also includes Read Only Memory (ROM) 810. ROM 810 may be, but is not limited to ROM, PROM, EPROM, EEPROM, and Flash ROM. ROM 810 stores firmware 820 including authentication module 830 which is used to perform user authentication and other functionality as described above using credential-derived keys. Authentication module 830 may interact with Credential Providers 831a . . . n. Lock Boxes 832a . . . n and User Profiles 833a . . . n as described above to authenticate users before allowing access to firmware services. A user 802 may interact with computing device 800 via Input Devices A and B (801A. 801B). For example. Input Device A (801A) may be a keyboard by which user 802 can enter a password which is used as input by a Credential Provider to generate a symmetric key. Similarly. Input Device B (801B) may be a fingerprint or retinal scanner by which user 802 can enter a credential which is used as input by a Credential Provider to generate a symmetric key. Computing device 800 may include a display 840 and a communication interface 850 suitable for communicating over a network.

Portions or all of the embodiments of the present invention may be provided as one or more computer-readable programs or code embodied on or in one or more non-transitory mediums. The mediums may be, but are not limited to a hard disk, a compact disc, a digital versatile disc, ROM, PROM, EPROM, EEPROM, Flash memory, a RAM, or a magnetic tape. In general, the computer-readable programs or code may be implemented in any computing language.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described, the order of the acts may be modified in other implementations consistent with the principles of the invention. Further, non-dependent acts may be performed in parallel.

I claim:

1. A method for enhancing security for firmware-provided services in a computing device, wherein the execution of the firmware causes the computing device to:
   receive a first user credential with a first user credential driver;
   generate a first symmetric key from the first user credential with the first user credential driver;
   decrypt at least a portion of a first firmware data container with the first symmetric key, the decrypted portion holding a second firmware data container;
   receive a second user credential with a second user credential driver;
   generate a second symmetric key from the second user credential with the second user credential driver, the second user credential being a different type of user credential than the first user credential, the second user credential, based on user biometric data or a removable device ID, extended into the second symmetric key;
   decrypt at least a portion of the second firmware data container with the second symmetric key, the decrypted portion holding a third symmetric user profile key previously used to encrypt a private portion of a third firmware data container holding a user profile;
   decrypt the private portion of the third firmware data container using the third symmetric user profile key;
   authenticate the user based on a determination of a successful decryption of the private portion of the third firmware data container; and
   provide access to a firmware service following the authenticating.

2. The method of claim 1, wherein the first and second user credentials were previously temporarily shared with firmware in the computing device to create symmetric keys identical to the first and second symmetric keys, the symmetric keys identical to the first and second symmetric keys used to respectively encrypt the first firmware data container and the second firmware data container and then discarded by the firmware.

3. The method of claim 1, wherein the execution of the firmware causes the computing device to:
   determine the successful decryption based on a known salt value being contained in the private portion of the third firmware data container.

4. The method of claim 1, wherein the first or second user credential is a password.

5. The method of claim 1, wherein the first or second user credential is a fingerprint scan or retinal scan.

6. The method of claim 1, wherein the first or second user credential is data from a smart card.

7. The method of claim 1, wherein the execution of the firmware occurs prior to a loading of an operating system for the computing device into memory.

8. The method of claim 1, wherein the execution of the firmware further causes the computing device to:
   retrieve a password recovery question from a public portion of the third firmware data container holding the user profile and convey the password recovery question to the user;
   extend a correct answer to the password recovery question into an answer password using the first or second user credential driver;
   create from the answer password a fourth symmetric key; and decrypt with the fourth symmetric key at least a portion of a fourth firmware data container holding a copy of the third symmetric user profile key;

decrypt the private portion of the third firmware data container using the copy of the third symmetric user profile key;

authenticate the user based on a determination of a successful decryption of the private portion of the third firmware data container; and provide access to the firmware service following the authenticating.

9. The method of claim 1, wherein the first or second user credential is a password and the firmware service to which access is provided is a password change service, and wherein the execution of the firmware further causes the computing device to:

receive a second password from the user;

generate a fourth symmetric key from the second password; and encrypt, using the fourth symmetric key, the private portion of the second data container holding the third symmetric user profile key, the private portion of the second data container previously decrypted with the second symmetric key.

10. A non-transitory medium holding computer-executable firmware instructions for enhancing security for firmware-provided services in a computing device, execution of the firmware instructions causing the computing device to:

receive a first user credential with a first user credential driver;

generate a first symmetric key from the first user credential with the first user credential driver;

decrypt at least a portion of a first firmware data container with the first symmetric key, the decrypted portion holding a second firmware data container;

receive a second user credential with a second user credential driver;

generate a second symmetric key from the second user credential with the second user credential driver, the second user credential being a different type of user credential than the first user credential, the second user credential, based on user biometric data or a removable device ID, extended into the second symmetric key;

decrypt at least a portion of the second firmware data container with the second symmetric key, the decrypted portion holding a third symmetric user profile key previously used to encrypt a private portion of a third firmware data container holding a user profile;

decrypt the private portion of the third firmware data container using the third symmetric user profile key;

authenticate the user based on a determination of a successful decryption of the private portion of the third firmware data container; and provide access to a firmware service following the authenticating.

11. The non-transitory medium of claim 10, wherein the first and second user credentials were previously temporarily shared with firmware in the computing device to create symmetric keys identical to the first and second symmetric keys, the symmetric keys identical to the first and second symmetric keys used to respectively encrypt the first firmware data container and second firmware data container and then discarded by the firmware.

12. The non-transitory medium of claim 10, wherein the instructions when executed further cause the computing device to:

determine the successful decryption based on a known salt value being contained in the private portion of the third firmware data container.

13. The non-transitory medium of claim 10, wherein the first or second user credential is a password.

14. The non-transitory medium of claim 10, wherein the first or second user credential is a fingerprint scan or retinal scan.

15. The non-transitory medium of claim 10, wherein the first or second user credential is data from a smart card.

16. The non-transitory medium of claim 10, wherein the firmware instructions are executed prior to loading an operating system for the computing device into memory.

17. The non-transitory medium of claim 10, wherein the instructions when executed further cause the computing device to:

provide a password recovery question in a public portion of the third firmware data container holding the user profile;

extend a correct answer to the password recovery question into an answer password using the first or second user credential driver;

create from the answer password a fourth symmetric key; and decrypt with the fourth symmetric key at least a portion of a fourth firmware data container holding a copy of the third symmetric user profile key;

decrypt the private portion of the third firmware data container using the copy of the third symmetric user profile key;

authenticate the user based on a determination of a successful decryption of the private portion of the third firmware data container; and provide access to the firmware service following the authenticating.

18. The non-transitory medium of claim 10, wherein the user credential is a password and the firmware service to which access is provided is a password change service, and wherein the instructions when executed further cause the computing device to:

receive a second password from the user;

generate a fourth symmetric key from the second password; and encrypt, using the fourth symmetric key, the private portion of the second firmware data container holding the third symmetric user profile key, the private portion of the second data container previously decrypted with the second symmetric key.

19. A computing device providing enhanced security of user authentication for firmware-provided services, comprising:

a processor;

an input device; and firmware, the firmware when executed causing the computing device to:

receive a first user credential with a first user credential driver;

generate a first symmetric key from the first user credential with the first user credential driver;

decrypt at least a portion of a first firmware data container with the first symmetric key, the decrypted portion holding a second firmware data container;

receive a second user credential with a second user credential driver;

generate a second symmetric key from the second user credential with the second user credential driver, the second user credential being a different type of user credential than the first user credential, the second user credential, based on user biometric data or a removable device ID, extended into the second symmetric key;

decrypt at least a portion of the second firmware data container with the second symmetric key, the decrypted portion holding a third symmetric user profile key previously used to encrypt a private portion of a third firmware data container holding a user profile;

decrypt the private portion of the third firmware data container using the third symmetric user profile key;

authenticate the user based on a determination of a successful decryption of the private portion of the third firmware data container; and provide access to a firmware service following the authenticating.

20. The computing device of claim 19, wherein the first and second user credentials were previously temporarily shared with firmware in the computing device to create symmetric keys identical to the first and second symmetric keys, the symmetric keys identical to the first and second symmetric keys used to respectively encrypt the first firmware data container and the second firmware data container and then discarded by the firmware.

21. The computing device of claim 19, wherein the input device is a fingerprint reader and the first or second user credential is a fingerprint.

22. The computing device of claim 19, wherein the input device is a retinal scan reader and the first or second user credential is a retinal scan.

23. The computing device of claim 19, wherein the firmware is executed prior to loading an operating system for the computing device into memory.

* * * * *